United States Patent [19]

Moodie

[11] 3,762,293

[45] Oct. 2, 1973

[54] MULTIPLE PHOTOGRAPH CAMERA SYSTEM

[75] Inventor: Donald E. Moodie, Nashua, N.H.

[73] Assignee: Polaroid Corporation, Cambridge, Mass.

[22] Filed: Oct. 26, 1971

[21] Appl. No.: 192,166

[52] U.S. Cl. .................................................. 95/37
[51] Int. Cl. .......................................... G03b 19/02
[58] Field of Search ............................ 95/36, 37, 38

[56] References Cited
UNITED STATES PATENTS

| | | | |
|---|---|---|---|
| 467,454 | 1/1892 | Walker | 95/38 |
| 872,871 | 12/1907 | Wayland | 95/37 |
| 1,045,539 | 11/1912 | Folmer | 95/37 |
| 2,386,276 | 10/1945 | Simjian | 95/82 |
| 3,283,685 | 11/1966 | Cummins | 95/18 |
| 3,242,837 | 3/1966 | Marjoram | 95/37 |
| 2,781,690 | 2/1957 | Fillingame | 95/37 |
| 2,584,311 | 2/1952 | Wells | 95/37 |
| 1,933,889 | 11/1933 | Burnell | 95/37 |
| 2,787,942 | 4/1957 | Edwards | 95/37 |

Primary Examiner—John M. Horan
Attorney—Robert L. Berger

[57] ABSTRACT

A camera system including a first section for forming an image at a focal plane and a second section slidably mounted on the first section for retaining a sheet of photographic material at a focal plane. A spring snap-action arrangement yieldably restrains the camera's second section in two terminal positions with respect to the first section of the camera system. Complementary light barrier labyrinth structure respectively forming part of the two camera sections is structured to facilitate the aforementioned sliding movement essentially without friction. Adjustable elongated stop bars are provided on one camera section for limiting the amount of such sliding movement.

26 Claims, 11 Drawing Figures

PATENTED OCT 2 1973
3,762,293

INVENTOR.
DONALD E. MOODIE

BY Brown and Mikulka

ATTORNEYS

INVENTOR.
DONALD E. MOODIE

BY Brown and Mikulka

ATTORNEYS

INVENTOR.
DONALD E. MOODIE

BY Brown and Mikulka

ATTORNEYS

PATENTED OCT 2 1973　　3,762,293

INVENTOR.
DONALD E. MOODIE

BY Brown and Mikulka

ATTORNEYS

MULTIPLE PHOTOGRAPH CAMERA SYSTEM

BACKGROUND OF THE INVENTION

1. Field of the Invention

This invention relates to camera systems and has particular reference to camera systems for producing more than one photograph from a single sheet of photographic material.

2. Description of the Prior Art

A variety of such camera systems have been disclosed in the prior art. The present invention involves the movement of a camera back to present different areas of a single sheet of photographic material to an imaging optical system in a camera.

The prior art of such systems is in two general structural categories. In one such category, various forms of film or plate support are in the open and movable from position to position on guide rails and through the use of latches, detents, and various pin and hole locating structures. An example is U.S. Pat. No. 2,584,311.

In the other general category, automatic or semi-automatic systems of considerable intricacy are enclosed in housings and, again, operated on guide rails with combinations of levers and locating detents. An example is U.S. Pat. No. 2,172,283.

Figure 2:
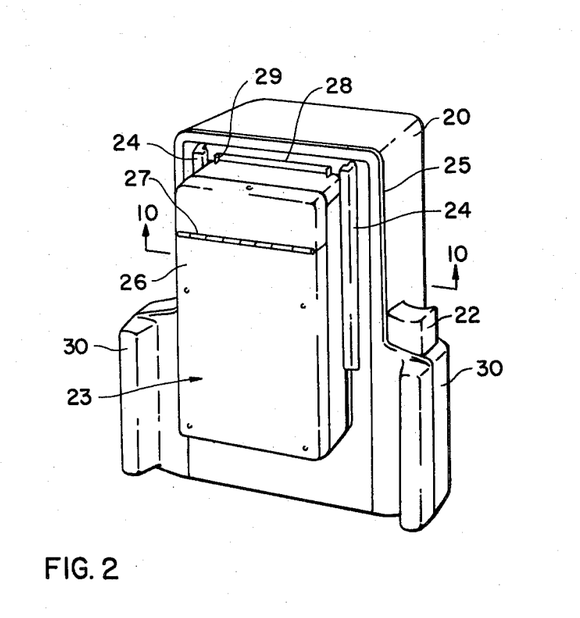
FIG. 2 is a rear view of the camera of FIG. 1.

Another example of an enclosed system of this nature is the German patent 924363 (1955) which, in FIG. 2, discloses an overcenter spring which is used in moving the film or plate holder from position to position.

In any such movement system, exclusion of light from the film or plate must be provided in some fashion. In the second group, the housing enclosures do not move. Some interior light barrier provisions are made. For example, in patent 2,172,283, FIG. 2, an interior sliding light shield 83 is shown with a flexible end edge 84 riding on a surface as a light excluder. In the first group, light is excluded by the sliding mount on the guide rails, sometimes aided by transverse end strips of material such as felt, for example, U.S. Pat. No. 2,388,240, items 26 and 26A.

Such prior art systems present difficulties in handling, use, and maintenance. They have light exclusion means for movement devices which involve the use of fixed housings, frictional guide means, or edge sliding engagements. Their stop means involve detent arrangements, or simple external end wall carriage stops.

SUMMARY OF THE INVENTION

Modern photographic equipment needs to be useful under modern conditions of operation. It thus needs to be simple and rugged, inexpensive and readily accessible for handling and operation, while accomplishing its functions repeatably and accurately in an improved fashion.

The present invention provides a solid camera body with a film carrying back housing slidably attached thereto for spring-aided manual movement between two positions, to present different portions of the film to an optical system and thereby to produce more than one photograph from a single sheet of film.

This function of photographic plurality is well known as a desirable capability for cameras, for example, cameras used for identification photography.

Simple manual accomplishment of such film movement is provided in this invention by making the film housing external and readily accessible to manual operation. Exclusion of light during such movement presents a problem which ordinarily is treated by using sliding guides which are also light barriers and which therefore, have to be precisely and expensively formed and assembled. The present invention provides inexpensive slide mountings with substantial manufacturing tolerances. Light exclusion during such movement in this invention is accomplished in large part by light labyrinth structure which provides frictionless light barriers.

The structure of this invention lends itself to a useful choice of forms of movable film holders. It may be, as shown by way of example herein, a standard form of ordinarily fixed camera back, with an adaptor structure. Frames or holders for cut film may also be used, in like fashion, with an adaptor, or a special back unit in any form may be provided for sliding attachment to the main camera body. One such form is a camera back presently marketed by Polaroid Corporation of Cambridge, Massachusetts, the Polaroid Model CB–100 Land Camera Back.

The present invention provides a camera back shuttle movement system in which simple, solid, spring-aided movement capability is accomplished externally, manually and directly. Further, a light barrier is provided which is effective as between moving parts, with minimized friction as between solids. Also, useful stop structure is provided on a simple, dependably repeatable basis to locate the camera back in each of two positions, one at each end of movement back and forth therebetween.

The illustration of this invention as set forth herein is in the form of a camera with a to and from sliding back. The back carries a film pack with a single film sheet movable with the back in a shuttle action between two positions to present different areas of the film sheet for exposure at the different positions of the back.

The back protrudes from the camera as a substantial body and is slidably moved manually by grasping the back and pushing or pulling it along a pair of attachment and guide rails. The simplicity and accessibility of this camera back provides a quick and useful way to change the film area open to exposure in the camera.

The movement of the camera back is positive and sure by the addition of spring bias in the direction of movement. This bias is effected in this illustration by a pair of overcenter springs connected for two way operation between the camera back and the main body of the camera. Accordingly, the back movement is manually initiated, then picked up and carried through by the overcenter springs which then act as spring bias holding means at each position of the back until overcome by manual initiation of the return movement between such positions. Loading and removal of film from the film pack may be arranged with respect to such positions according to particular camera systems or use, as desired. Cut film may be carried by the camera back of its like or any other suitable form of photographic sheet material.

The extent of such snap-action movement of the back is repeatably and surely controlled by a pair of stop bars, elongate in the direction of such movement. These bars are secured to the main body of the camera and their ends engage abutments interiorly of the movable back unit to define the positions of the back necessary to suitably present selected areas of the film sheet in the camera system for exposure. The stop bars are adjustable lengthwise but the lengths of the bars do not change. The bars are parallel and supplement each other. One bar could be used alone. Two are used to provide surer and more solid stops for the spring biased back movement. Most importantly, the use of two stop bars precludes cocking or binding of the back, thereby allowing relaxed tolerances in the guide rails since they do not have to hold the back against such unbalance as would occur if only one bar were employed.

A light barrier is provided to exclude light from between the camera back and the camera body during the movement of the back. Transversely of the camera back, adjacent each end thereof a strip of felt is used, sweeping along a smooth plate. Lengthwise of the camera back, a light labyrinth is provided on each side of the back. Each labyrinth is a channel in the inner face of the camera back and a long narrow boss on the camera body, lying in the channel, without touching.

Accordingly, the slide guide and attachment assembly may be manufactured inexpensively, without close tolerance requirements since the lengthwise light exclusion requirements are met by the light labyrinths.

An adaptor plate is provided for fixed attachment to the camera back and sliding attachments to the main camera body. In this fashion, a standard camera back, ordinarily fixed to the main camera body is usable in a sliding back unit.

It is therefore an object of this invention to provide a new and improved camera system for producing more than one photograph from a single sheet of photographic material.

Further objects and advantages of this invention will be in part apparent and in part pointed out hereinafter and in the accompanying drawings, wherein.

Figure 1:
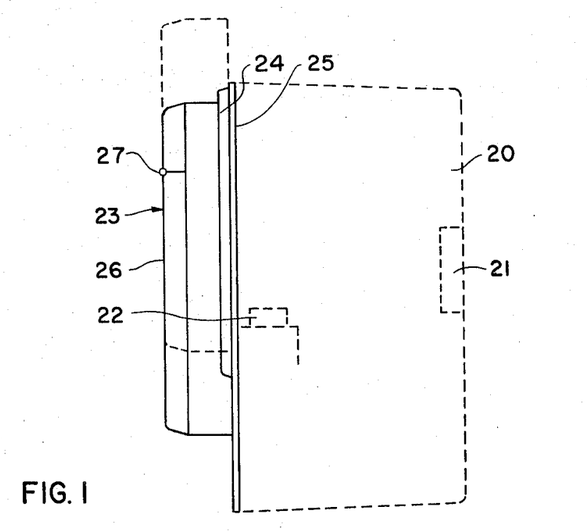
FIG. 1 is an external side view of a camera system according to this invention.

The FIG. 1 illustration shows a main camera body 20, a lens unit 21 and an operating button 22, in dotted line form as associative structure with this invention. A movable camera back 23 is shown as vertically slidable between two positions. The down position is shown in solid lines and the up position in dotted lines. A back guide and attachment rail 24 is also shown attached to a camera back plate 25. The camera back 23 has an openable rear cover 26, about a hinge 27.

FIG. 2 shows more of the structure of FIG. 1. It shows in addition to FIG. 1, both guide rails 24, a portion of a back baffle plate 28 with upturned side edges 29 which form part of the light barrier labyrinth, shown in FIG. 9 for example. FIG. 2, further, shows a pair of side camera handles 30.

Figure 3:
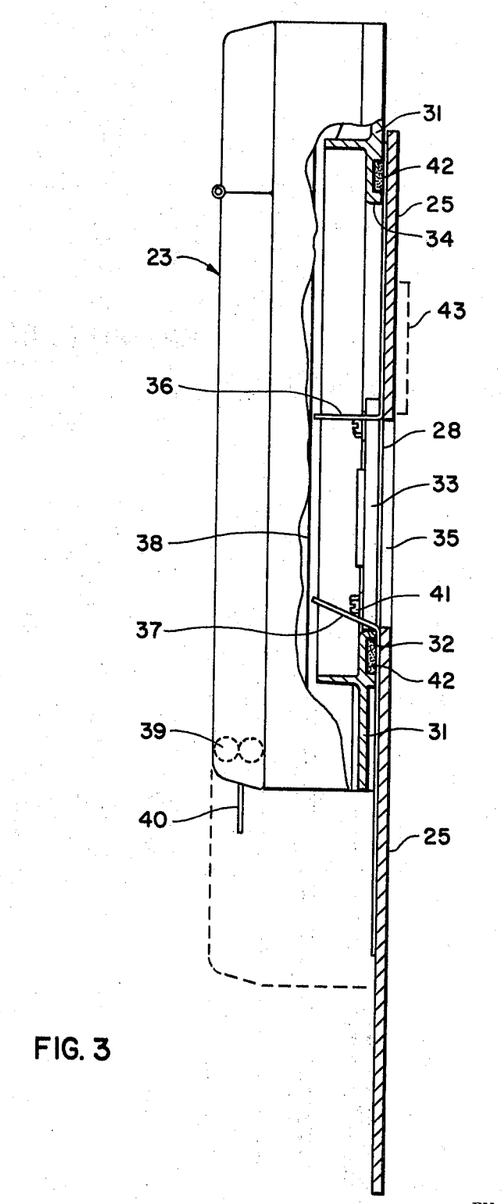
FIG. 3 is an enlargement, partly cut away and sectioned, of the back assembly of FIGS. 1 and 2.

The FIG. 3 enlargement additionally shows a section of an adaptor plate 31 as part of the back 23 for slidably mounting the back 23 on the back plate 25. The back 23 is shown in solid line at its up position as determined by the engagement of an interior abutment 32 in the adaptor plate 31, with the bottom end of a stop bar 33. In the down position, the top end of stop bar 33 is engaged by the interior abutment 34 in the adaptor plate 31. Each stop bar is mounted by bolts in adjustment slots for lengthwise adjustment. The back plate 25 has a light aperture 35 therethrough and the baffle plate 28 has a light aperture overlying the aperture 35 with top and bottom rearward baffles 36 and 37. The baffles 36 and 37 extend to a vertical focal plane 38 at which a film sheet is mounted by the camera back.

Further in FIG. 3, the camera back 23 is shown with a pair of rollers 39 indicative of means for spreading development material over an exposed film. Such structure is provided in the aforementioned Polaroid Model CB–100 Land Camera Back. Further detail of FIG. 3 is an indication of a film pull tab 40, bolts 41 for securing the stop bars 33 to the camera back 25 through the baffle plate 28, and napped material 42 such as velvet as cross pieces recessed in the sliding face of the adaptor plate. This is part of the light exclusion structure which moves up and down on the baffle plate 28 with the camera back 23. The dotted area 43 indicates the location of overcenter springs 44, see FIG. 4, for snap-action in aid of manual movement of the camera back 23 between the two shown positions on a two-way shuttle basis. These springs are mounted over the interior face of the back plate with one end connected to the back plate 25 and the other end connected to the adaptor plate 31 through vertical slots 45, FIG. 4, and both pivotally connected.

Figure 4:
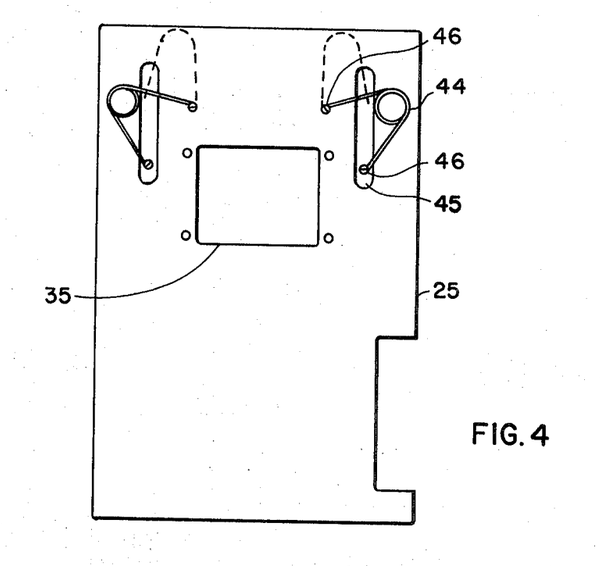
FIG. 4 is a front (internal) view of the back plate of the camera system of FIGS. 1-3.

In FIG. 4, the interior face mounting of the overcenter springs, 44 on the back plate 25 is shown in the two positions thereof for the up and down positions of the camera back. Connector bolts 46, therefor, extend through the slots 45 to secure the springs 44 to the adaptor plate 31, FIG. 3. The overcenter springs are in loop form and at one point of the movement of the back 23, the ends of the springs are horizontally close to each other, in passing.

Figure 5:
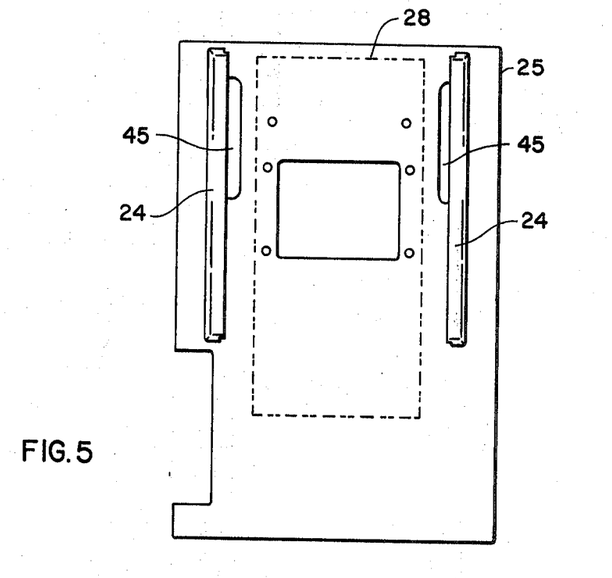
FIG. 5 is a rear (external) view of the back plate of FIG. 4.

In FIG. 5, the outer face of the back plate 25 is shown with the guide rails 24. The position of the baffle plate 28 is shown in phantom.

Figure 6:
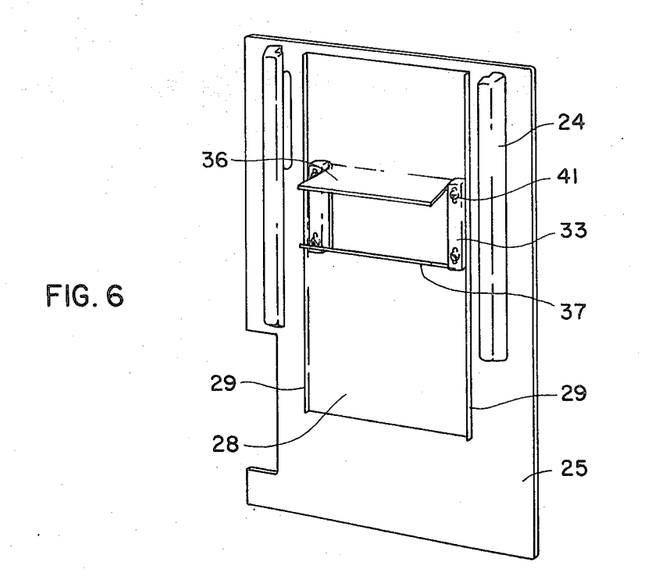
FIG. 6 is a rear perspective of the FIG. 5 back plate, including the baffle plate and stop bars.
Figure 7:
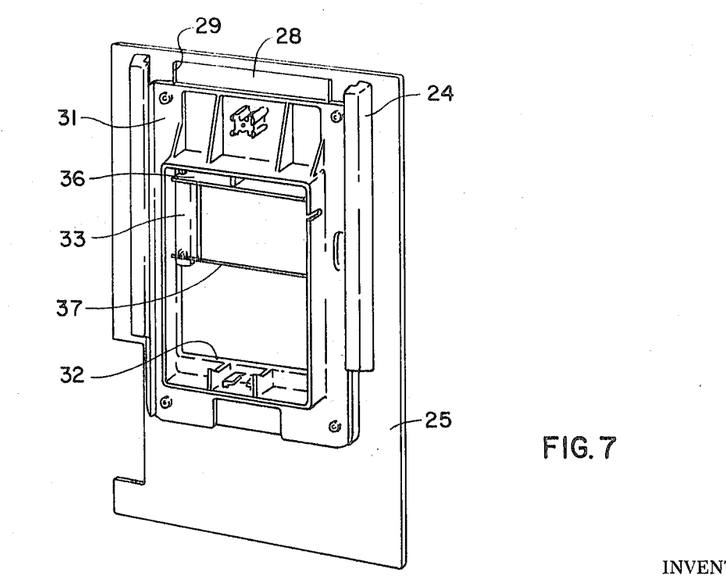
FIG. 7 is the FIG. 6 structure with the adaptor plate thereon.

FIG. 6 shows the FIG. 5 structure with the baffle plate 28 mounted thereon, and FIG. 7 shows the FIG. 6 structure with the adaptor plate 31 mounted thereon.

Figure 8:
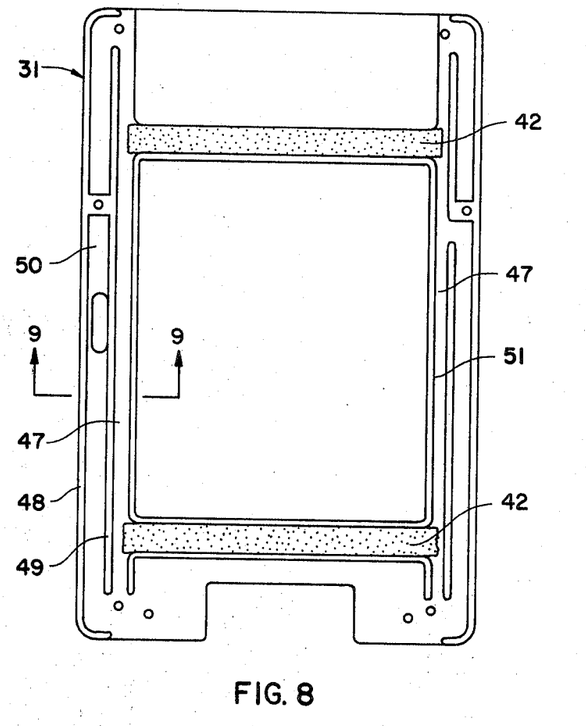
FIG. 8 is the sliding face of the adaptor plate of FIG. 7 (external to the back section)
Figure 9:
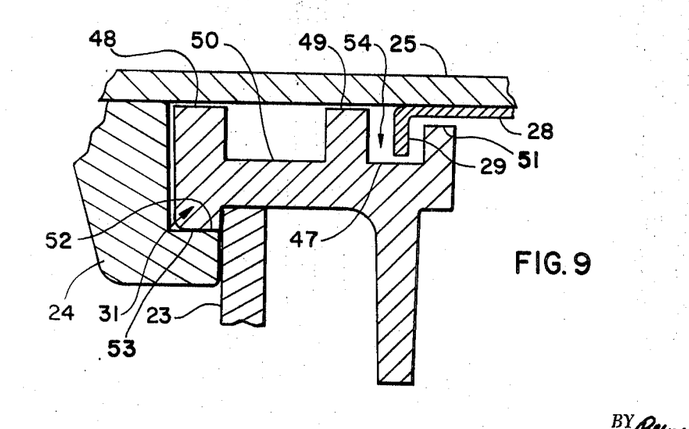
FIG. 9 is a section taken on line 9—9 of FIG. 8.

FIG. 8 is the sliding face of the adaptor plate 31, showing the transverse felt light barrier strips 42 and elongate channels 47 for receiving the turned up edges 29 of the baffle plate 28, without touching. This provides the labyrinth light barrier as in FIG. 9 for light exclusion between the back 23 and the main camera body 20 during the movement of the camera back. The channels 47 travel along the baffle edges 29. The tortuous light passage indicated by arrow 54, FIG. 9, is the light barrier of the labyrinth. This structure is of course a light barrier when the camera back is at rest, but its significance is that it is a frictionless light barrier during the movement of the camera back. Thus inexpensive manufacture and materials for the slide attachment of the camera back can be accomplished. The attachment mounting is solid but slightly loose and the manufacturing tolerances are not critical.

FIGS. 8 and 9, further, show that the face of the adaptor plate 31 adjacent the baffle plate is made up of long, narrow flat strip faces 48 and 49. These strips are formed as walls of a cut-away channel 50. The light labyrinth channel 47 also forms a strip face 51 but it is cut low to accomodate the baffle plate 28. Accordingly, sliding contact between the camera back adaptor 31 and the camera back plate 25 with the baffle plate 28 thereon is in the adaptor faces 48 and 49, on the rear face of the back plate and the transverse felt strips 42 on the slide face of the baffle plate 28. These felt strips have a degree of resilience and tend to hold the camera back and adaptor 23 and 31 away from the camera back plate particularly since the camera back assemblage is normally vertical and the movement thereof is up and down. Thus, to some extent, as in FIG. 9, there is sliding contact between the side edges 52 of the exterior face of the adaptor plate 31 and overhang faces 53 of the guide rails 24. The whole sliding back structure is solid and precise in its two positions while at the same time it has a significant amount of play in its mounting. This allows for easier movement and requires relatively loose manufacturing tolerances in the various parts. Manufacturing expense is thus reduced, and reliance on the slide mounting as a light barrier is not necessary.

Figure 10:
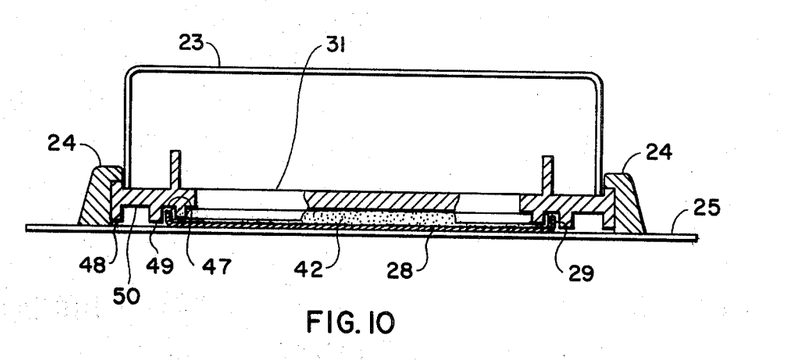
FIG. 10 is a schematic section of the camera back assembly according to this invention, taken on line 10—10 of FIG. 2.

FIG. 10 is illustrative of the slide assembly of the camera back and adaptor 23 and 31 together as a unit on the camera back plate 25.

Figure 11:
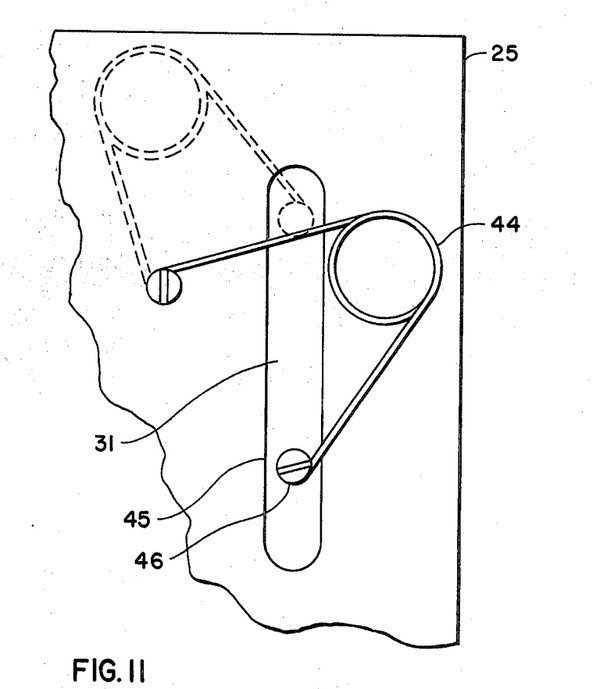
FIG. 11 is a schematic showing of the form and operation of the overcenter springs as an aid to manual movement of the camera back, according to this invention.

FIG. 11 is illustrative of the mounting and operation of the overcenter springs 44 connected between the back plate 25 and the adaptor plate 31 by bolts 46 through slots 45 in the back plate 25.

Accordingly, the illustrated structure of this invention comprises a camera back plate 25, a baffle plate 28 mounted on the exterior side of the back plate, an adaptor plate 31 slidably mounted in guide rails 24 on the exterior side of the back plate, and a film sheet carrying camera back 23 fixed to the adaptor plate for movement therewith. The baffle plate is mounted between the guide rails. The elongate stop bars 33, parallel to the guide rails, are mounted on the baffle plate with mounting bolts 41 which extend through the baffle plate into the back plate. These bolts thus also secure the baffle plate to the back plate. The stop bars have slots for receiving these bolts, for lengthwise adjustment of the bars. Note that such adjustment does not change the length of the bars nor the extent of the movement of the camera back. The adjustment is for proper positioning of the different film areas with respect to the light openings in the back plate and baffle plate and with respect to the optical system operating through such openings with its intrinsic variations and alignments.

The adaptor plate has a large opening therethrough to frame all of the film area which is openable to exposure. The stop bar ends engage the inner end walls of this adaptor plate form, one at a time, to terminate the camera back movement and to thus define each of the two positions of the camera back as each of the halves of the film area are thus presented in position for exposure.

The camera back 23 is fixed to the adaptor plate 31, and a sheet of photographic material may be mounted therein at the focal plane 38 of the lens system 21 in the main camera body 20 and for movement along this plane as the camera back is moved. The photographic sheet may be part of a film pack, cut film in a suitable holder and possibly with the camera back in somewhat different form, and like suitable structures and arrangements.

The light barrier system for excluding extraneous light from the film sheet and from between the adaptor plate and the back plate comprises a pair of cross-strips 42 of napped material such as velvet, with appreciable resilience, and a pair of light labyrinth systems lengthwise of the adaptor plate 31, and in the direction of movement of the camera back 25.

The cross-strips 42 are mounted in recesses in the slide face of the adaptor plate, one adjacent each end of the plate. These napped strips slide sideways along and in contact with the external surface of the baffle plate.

The light labyrinth systems include an elongate channel 47 in the slide face of the adaptor plate 31, one adjacent each side of the adaptor plate, and extending and parallel with each other in the direction of movement of the camera back 23. The baffle plate side edges 29 are turned up to form elongate, narrow boss forms which lie in the elongate channels 47 of the adaptor plate 31, without contact therein.

Thus, transversely approaching extraneous light may negotiate the somewhat loose fit of the adaptor plate 31 in the guide rails 24 but it is trapped in the tortuous path formed by the baffle plate edges 29 lying in the adaptor plate channels 47. These elements do not contact each other during the movement of the camera back. Thus a highly effective light barrier is provided, while friction is essentially zero in the light labyrinth structure.

In the system of this invention, the lens system 21 is mounted in the main body 20 and is designed and arranged to form a subject image at the focal plane 38 within the camera back unit 23.

The camera back unit 23 includes the adaptor plate 31 and is in the form of a film pack housing mounted on the outside of the rear of the main camera body housing 20. The back unit is mounted for manual movement up and down on the outside of the camera body 20, with two operative positions, one at the top terminus and one at the bottom terminus of such movement, The side edges of the adaptor plate 31 are mounted in slide guide rails 24 by way of attachment of the camera back unit 23 to the camera body 20 with manually actuated sliding capability in such rails and on the camera body 20. The camera back unit 23 is thus directly accessible to such manual operation, this being accomplished by grasping the back unit with the hand and pulling it in the desired direction, or by simply pushing or pulling the back unit by direct operator contact and operation. Overcenter springs 44 are connected between the camera back plate 25 and the adaptor plate 31, in aid of such manual operation. The springs are in wishbone form with a coil at the elbow and each end is pivotally mounted. This invention thus provides snap-action pick up of manually initiated movement of a camera back on a camera, between two positions for presenting different areas of a film sheet for exposure.

Within the camera back unit 23, mounting means is provided for a film pack in order to mount a sheet of film in such pack at the focal plane 38 and for movement along this plane as the camera back is moved between its two positions. This mounting means may take any suitable form in the nature of support abutments and nesting arrangements for the film pack, within the camera back, including spring means for holding the pack in place. Such mounting means is included in and exemplified by the Polaroid Model CB-100 Land Camera Back. Similar suitable mounting means may be used for cut film holders or other devices for holding particular forms of photographic sheet material.

The overcenter springs 44 act as spring bias in each direction of movement of the camera back, not only in aid of such movement to provide solid, sure action, but also as a holding bias to secure the camera back in each of its positions.

The stop bars 33 are mounted on the baffle plate 28 and thus on the back plate 25. However, they lie within the camera back unit 23, specifically within the opening through the adaptor plate 31. As the camera back is moved, it terminates at top and bottom positions under the bias of the springs 44. These terminals are accomplished by engagement of the ends of the stop bars 33 with abutments within the adaptor plate 31. In the up position, the abutment is 32, and in the down position, the abutment is 34. As noted, the stop bars 33 are adjustable in the direction of their length, without changing that length and thus without changing the distance that the camera back is moved. This distance matches the vertical dimension of each area of the film to be presented to the optical system for exposure and is ordinarily one half the vertical dimension of the available film area. Thus, one half of the film is exposed at one position of the camera back and the other half at the other position.

Extraneous light is always a problem in camera systems, particularly when there are relatively moving sections in the system with one of the sections containing a sheet of film subject to unwanted exposure by leakage of such light into the system.

When the interface of such moving parts is covered by a fixed housing, the problem is lessened, but some sort of internal light barrier is ordinarily used.

When such interface is exposed, the guide assemblies between the two sections must be light tight, especially during such movement. This requires highly precise, expensive, and intricate assemblies which involve substantial friction during such movement unless the mating parts are highly polished, formed with tight tolerances, or somehow oiled or greased.

In this invention, not only is the interface of the relatively movable camera back 23 and the main body 20, exposed along the edges of the adaptor plate 31, but it is desirable, under modern needs, to provide devices that are highly effective, without being overly expensive to manufacture.

This invention, accordingly, provides the light labyrinth illustrated particularly in FIGS. 8, 9, and 10, and indicated in FIG. 9 by the arrow 54. The outturned edges 29 of the baffle plate 28 lie in the channel 47 of the adaptor plate 31, without contact and, therefore, without solid to solid friction as the camera back moves. The ends of the film area are protected against extraneous light by the conventional strips of velvet 42 or the like, sliding sideways along the external face of the baffle plate.

Since such side access light labyrinths are highly effective, it is not necessary to provide light tight, highly precise or intricate forms of sliding assembly. Thus the camera back 23 and its adaptor plate 31 as a unit, are solidly, but somewhat loosely mounted for sliding movement on the camera back plate 25, in the guide rails 24. This loose fitting arrangement is exaggerated in FIG. 9 for purposes of illustration. In FIG. 9, also, the adaptor plate slide face strips 48 and 49 are shown out of engagement with the adaptor plate. This, also, is an exaggeration to illustrate the point that the napped cross strips 42 have a degree of resilience which tends to hold the camera back away from the back plate and place the adaptor plate edge faces 52 and the guide rail overhang faces 53 in mutual relative movement sliding contact. In any case, the inner wall face 51 of the labyrinth structure is spaced from the baffle plate 28. Thus, the sliding contact between the camera back 23 and the back plate assembly is wholly on the basis of the narrow strip contact of adaptor plate strip faces 48, 49 and 52.

In the operation of the illustrated system, the camera back cover 26 is opened, the film pack is slipped in, and the cover closed. The camera back is located in either of its positions, according to the needs of a particular usage, if any. Then the button 22 is depressed to expose one half of the film sheet. Then, if there are no associative elements such as flash devices, or if all such elements are ready, the camera back is moved to its second position and the button 22 is again depressed to expose the other half of the film. The pull tab 40 is then used, in either position of the back, to prepare the film for removal, in the manner customary to the camera back illustrated herein.

This invention, therefore, provides a new and useful multiple photograph camera. It features spring-aided manual operation of the sliding back, with the back accessible to such operation. It further features internal simple stop means with adjustment but unalterable in spacing. It also features a unique combination of light barrier means, especially adapted for effectiveness during the the movement of the camera back and featuring light labyrinth structure of overlapping forms, without contact therebetween.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

What is claimed is:

1. A camera system for producing more than one photograph from a single sheet of photographic material, said system comprising:

a first section, including means for forming an image at a focal plane;

a second section, mounted for and accessible to direct manual movement thereof in slidable attachment to said first section, including means for mounting a sheet of photographic material at said focal plane for movement with said second section and along said focal plane; and     overcenter spring means connecting said sections to add snap-action to said manual movement in each of two directions between two positions of said second section, at which positions different areas of said photographic sheet are presented to said image forming means.

2. A camera system according to claim 1, additionally comprising:
means between said sections for excluding light from said sheet of photographic material during said movement of said second section, essentially without friction in said light excluding means.

3. A camera system according to claim 1, additionally comprising:
means between said sections for excluding light from said sheet of photographic material, including overlapping, spaced forms without contact between said forms during said movement of said second section.

4. A camera system according to claim 1, additionally comprising:
an elongate channel in one of said sections; and
an elongate boss on the other of said sections lying in said channel without contact therewith,
said boss and channel together comprising light excluding means.

5. A camera system according to claim 1, additionally comprising:
a light labyrinth between said sections, essentially without friction during said movement of said second section.

6. A camera system according to claim 1, additionally comprising:
an elongate bar on one of said sections; and
a pair of abutments on the other of said sections, spaced from each other a greater distance than the length of said bar, for end engagement with said bar to stop said movement of said second section at said positions of said second section.

7. A camera system according to claim 1, additionally comprising:
an elongate stop bar on one of said sections;
a pair of abutments on the other of said sections for end engagement with said stop bar to define said positions of said second section; and
a light labyrinth between said sections, essentially without friction during said movement of said second section.

8. A camera system according to claim 1, wherein: said second section is a container for a film pack.

9. A camera system according to claim 1, wherein: said second section is a frame for holding cut film.

10. A camera system according to claim 1, wherein: said second section includes means for spreading a processing fluid across said sheet of photographic material after exposure thereof.

11. A camera system according to claim 1, wherein: said second section is a standard form of camera back mounted on a slide adaptor unit which is, in turn, slidably attached to said first section.

12. A camera system according to claim 1, wherein: said second section is a cut film support mounted on a slide adaptor unit which is, in turn, slidably attached to said first section.

13. A camera system according to claim 1, wherein: said second section is a camera back ordinarily fixed to a camera structure of the nature of said first section, in fixed combination with a slide adaptor which is slidably attached to said first section.

14. A camera system according to claim 1, additionally comprising:
means for excluding undesirable light from said sheet of photographic material at each of said positions and during said movement of said second section;
said light excluding means comprising a light shield labyrinth of overlapping forms which are relatively movable in response to said movement of said second section, without touching between said overlapping forms; and
said overlapping forms comprising an elongate channel in one of said sections and an elongate boss on the other of said sections and lying in said channel.

15. A camera system for producing more than one photograph from a single sheet of photographic material, said system comprising:
a first section, including an optical system for forming an image at a focal plane;
a second section for mounting a sheet of photographic material at said focal plane, slidably attached to said first section for moving such photographic sheet along said focal plane and between two positions, to present a different area of said photographic sheet to said optical system at each of said positions;
means for resiliently biasing said second section in the direction of said movement from and beyond an intermediate point of said movement; and
stop means for locating said second section at each of said positions;
said stop means comprising a pair of abutments on one of said sections and an elongate bar on the other of said sections, for engagement of one end of said bar with one of said abutments and the other end of said bar with the other of said abutments to accomplish said location of said second section at each of said positions.

16. A camera system according to claim 15, additionally comprising:
means for adjusting said elongate bar lengthwise.

17. A camera system according to claim 15, wherein: said elongate bar is mounted on said first section and said abutments are part of said second section.

18. A camera system according to claim 15, wherein: said elongate bar is mounted on said first section for adjustment lengthwise of said bar and said abutments are part of said second section.

19. A camera system according to claim 15, wherein: said first section is the main body of the camera; said second section is a shallow box-like back on said main body;
said abutments are part of the interior wall formation of said back; and
said elongate bar is mounted on said first section.

20. A camera assembly for use in a system for producing more than one photograph from a single sheet of photographic material, said assembly comprising:
support means;
means attached to said support means for receiving a sheet of photographic material, said sheet receiving means being mounted on said support means for displacement between two positions, both at a focal plane in said system;
complementary means formed on said support means and said sheet receiving means for excluding undesirable light from said photographic sheet, said complementary means being configured to provide relative motion between respective portions thereof with a minimum of friction being developed therebetween during said displacement; and spring means for yieldably restraining said sheet receiving means in either of its said two positions once it has been displaced into either of its said two positions.

21. For use in a system for producing more than one photograph from a single sheet of photographic material, camera structure comprising:
a first section, including an optical system for forming an image at a focal plane;
a second section attached to said first section for mounting such a sheet of photographic material at said focal plane, said second section including a light labyrinth component;
a back plate on said first section; and
means on said back plate for excluding undesired light from such sheet of photographic material when such sheet is mounted at said focal plane within said second section;
said light excluding means comprising a light labyrinth component spaced from said light labyrinth component of said second section for light exclusion cooperation with said light labyrinth component of said second section by presenting in combination a torturous path to light rays attempting to pass thereacross.

22. A camera system comprising:
a camera body, including means for forming an image at a focal plane;
a back plate on said camera with a light opening therethrough;
a pair of attachment and guide rails mounted in parallel on the outside of said back plate, with said back plate opening therebetween;
a baffle plate mounted on said back plate between said rails;
said baffle plate having a light opening in optical alignment with said back plate opening;
said baffle plate, further, having an outer slide surface and a pair of side, turned up edges in the form of elongate light baffle bosses each between one of said guide rails and said light openings;
a pair of elongate stop bars mounted on said baffle plate parallel to said baffle plate edges, each between one of said edges and said light openings;
a camera back mounted on said guide rails for mounting a sheet of photographic material at said focal plane and for movement along said focal plane to present different areas of said photographic sheet to said image forming means;
overcenter spring means connected between said camera back and said camera body for adding snap-action to said camera back movement;
stop abutments inside opposite ends of said camera back for engagement with the ends of said stop bars;
elongate channel means on the inner face of said camera back and receiving without touching said edges of said baffle plate to provide light barrier labyrinths between said camera back and body; and
a band of napped fabric across each end portion of said camera back and between said light labyrinths, as light barriers for sliding along said baffle plate slide surface to complete a movable rectangular light barrier which travels with said moving back.

23. A camera system for producing more than one photograph from a single sheet of photographic material, said system comprising:
a first section including means for forming an image at a focal plane;
a second section including means for mounting a sheet of photographic material and means for spreading a processing fluid across said sheet of photographic material responsive to relative motion being effected between said sheet of photographic material and said fluid spreading means;
means for slidably mounting said second section on said first section with said sheet of photographic material positioned to be displaced along said focal plane responsive to said second section being slidably moved with respect to said first section;
means for effecting a light seal between said first section and said second section which is maintained during said slidable movement, said light seal effecting means including complementary labyrinth defining means on said first and second sections extending along the direction of said slidable movement; and
means for limiting said slidable movement of said second camera section to respectively locate first and second sections of said sheet of photographic material in operative relationship with said image forming means, said movement limiting means including at least one elongated bar adjustably mounted on one of said camera sections for selective movement along its length axis and a pair of abutment surfaces located on said other camera section positioned to alternately engage respective ends of said elongated bar to limit said slidable movement.

24. A photographic system comprising:
a first section, including means for forming an image at a focal plane;
a second section, mounted for and accessible to direct manual movement thereof in slidable attachment to said first section, including means for mounting photographic sheet material at said focal plane;
stop means for locating said second section at each of two positions, to present different areas of said photographic material, to said image forming means at each of said positions, said stop means comrising a pair of abutments on one of said sections and an elongate bar on the other of said sections, endwise between said abutments; and
means for adjusting said elongate bar along its length axis.

25. A photographic system comprising:
a first section, including means for forming an image at a focal plane;
a second section, mounted for and accessible to direct manual movement thereof in slidable attachment to said first section, including means for mounting photographic sheet material at said focal plane; and
spring means connected to add snap-action to said manual movement between different positions of said second section to present different areas of said photographic material to said image forming means at each of such positions, said spring means comprising an overcenter arched spring with its ends closely adjacent each other at one point of such movement of said second section.

26. A camera system for producing more than one photograph from a single sheet of photographic material, said system comprising:
   a first section, including means for forming an image at a focal plane;
   a second section mounted for and accessible to direct manual movement thereof in slidable attachment to said first section between first and second positions relative thereto, said second section including means for mounting a sheet of photographic material at said focal plane for movement with said second section and along said focal plane; and
   spring means for yieldably restraining said second sction in both of said positions, at which positions different areas of said photographic sheet are presented to said image forming means.

* * * * *